United States Patent
Davis

(10) Patent No.: US 10,136,099 B2
(45) Date of Patent: Nov. 20, 2018

(54) METHOD OF TEMPORAL RESAMPLING AND APPARENT MOTION SPEED CHANGE FOR MOTION PICTURE DATA

(71) Applicant: RealD Inc., Beverly Hills, CA (US)

(72) Inventor: Anthony Davis, Albuquerque, NM (US)

(73) Assignee: RealD LUXE, LLC, Beverly Hills, CA (US)

( * ) Notice: Subject to any disclaimer, the term of this patent is extended or adjusted under 35 U.S.C. 154(b) by 0 days.

(21) Appl. No.: 15/181,860

(22) Filed: Jun. 14, 2016

(65) Prior Publication Data

US 2017/0094221 A1    Mar. 30, 2017

Related U.S. Application Data

(60) Provisional application No. 62/185,592, filed on Jun. 27, 2015.

(51) Int. Cl.
| | |
|---|---|
| *H04N 5/92* | (2006.01) |
| *H04N 5/917* | (2006.01) |
| *H04N 7/01* | (2006.01) |
| *G06T 5/50* | (2006.01) |
| *G06T 5/20* | (2006.01) |

(52) U.S. Cl.
CPC ............. *H04N 7/0102* (2013.01); *G06T 5/20* (2013.01); *G06T 5/50* (2013.01); *H04N 7/0127* (2013.01); *G06T 2207/10016* (2013.01); *G06T 2207/20221* (2013.01)

(58) Field of Classification Search
CPC ...... H04N 7/0102; H04N 7/0127; G06T 5/50; G06T 5/20; G06T 2207/20221; G06T 2207/10016

USPC ....... 386/241, 326, 328, 329, 343, 345, 348, 386/347

See application file for complete search history.

(56) References Cited

U.S. PATENT DOCUMENTS

| | | | | |
|---|---|---|---|---|
| 5,377,051 A | * | 12/1994 | Lane ................... | G11B 5/0086 348/E5.007 |
| 2005/0122393 A1 | * | 6/2005 | Cockerton ........ | H04L 29/06027 348/14.12 |

* cited by examiner

*Primary Examiner* — Robert Chevalier
(74) *Attorney, Agent, or Firm* — Penny L. Lowry; Neil G. Mothew

(57) ABSTRACT

The present invention is a method of processing a sequence of frames from digital motion picture cameras to allow remapping of the time-base of the input frames to a new and possibly variable time-base in the output frame sequence. This invention provides a method that makes small adjustments to the user's specified positions to achieve optimal integer mapping from input frames to output frames in the integrated function. The present invention provides for an algorithm for frame rate resampling providing a method for determining the mapping of input frames to output frames and a method for smoothly ramping the mapping of input frames to output frames based on interactive user input and a method for optimizing the alignment of input frames to output frames such that during areas of constant speed the alignment is optimally centered on the frames and a method for computing the weighting function for averaging input frames to output frames and a method for handling negative values in the weighting function in regions of bright highlights.

11 Claims, 3 Drawing Sheets

METHOD OF TEMPORAL RESAMPLING AND APPARENT MOTION SPEED CHANGE FOR MOTION PICTURE DATA

This application claims the benefit of U.S. Provisional Application No. 62/185,592, filed Jun. 27, 2015 and the entire content is incorporated by reference herein and made part of this specification.

FIELD OF THE INVENTION

The present invention provides a method of processing a sequence of frames from digital motion picture cameras to allow remapping of the time-base of the input frames to a new and possibly variable time-base in the output frame sequence.

BACKGROUND OF THE INVENTION

The present invention provides for a method of transforming over time (or temporally resampling) a set of input frames from a digital cinema camera to produce an output sequence of frames with different temporal sampling, meaning different playback frame rate, variable apparent motion rate, or a combination of both.

Digital cinema cameras are not often capable of "speed ramps," which are commonly used with film cameras. In a film camera, the frame rate of acquisition is changed continuously during a shot, allowing the apparent speed of motion of actors or objects in the scene to vary during constant frame rate playback. The artistic uses of this technique were widely varied, but the limitations of digital cameras have prevented this technique.

Current methods of temporal resampling are limited by their ability to generate a proper transform function and to apply a finite impulse response (FIR) filter.

The transform function is the function that provides the mapping between the input frame set and the output frame set and vice versa. It is desired that the transform function be user variable, but it is also desirable that the transformation function map integer frame numbers as often as possible. These are sometimes contradictory requirements, as allowing the user full control of the resampling function, and allowing the resampling function to have a smooth derivative will usually result in non-integer mapping of frame numbers.

Once transformed from input to output frames, there is still the problem of properly resampling the input frames surrounding the time center to create an output frame with good temporal response. This involves the use of a finite impulse response (FIR) filter to perform a weighted average of input frames for each output frame. Proper FIR creation often results in weighting with negative coefficients. As a principle of signal processing, this is mathematically correct, but in practice the negative weighting coefficients present a problem when very bright highlights in the image set are later clipped in editing. The negative values created from these very positive input data can present unwelcome artifacts when the positive data is later clipped. Restricting FIR coefficients to only positive values dramatically limits the possible frequency responses available for resampling.

Current methods of frame rate resampling rely upon simple nearest-neighbor mapping of input to output frame numbers, and in a speed ramp often result in stuttered or jerky motion. The present invention optimizes the temporal relationship between the input and output frames, and by adjusting the weighting of the FIR filter, achieves a much more accurate motion look. The smooth FIR waveform, in turn, can result in negative image values, and the damped subtraction in the present invention alleviates potential discontinuities based on sensor clipping or color adjustment in post production.

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

SUMMARY

Figure 1:
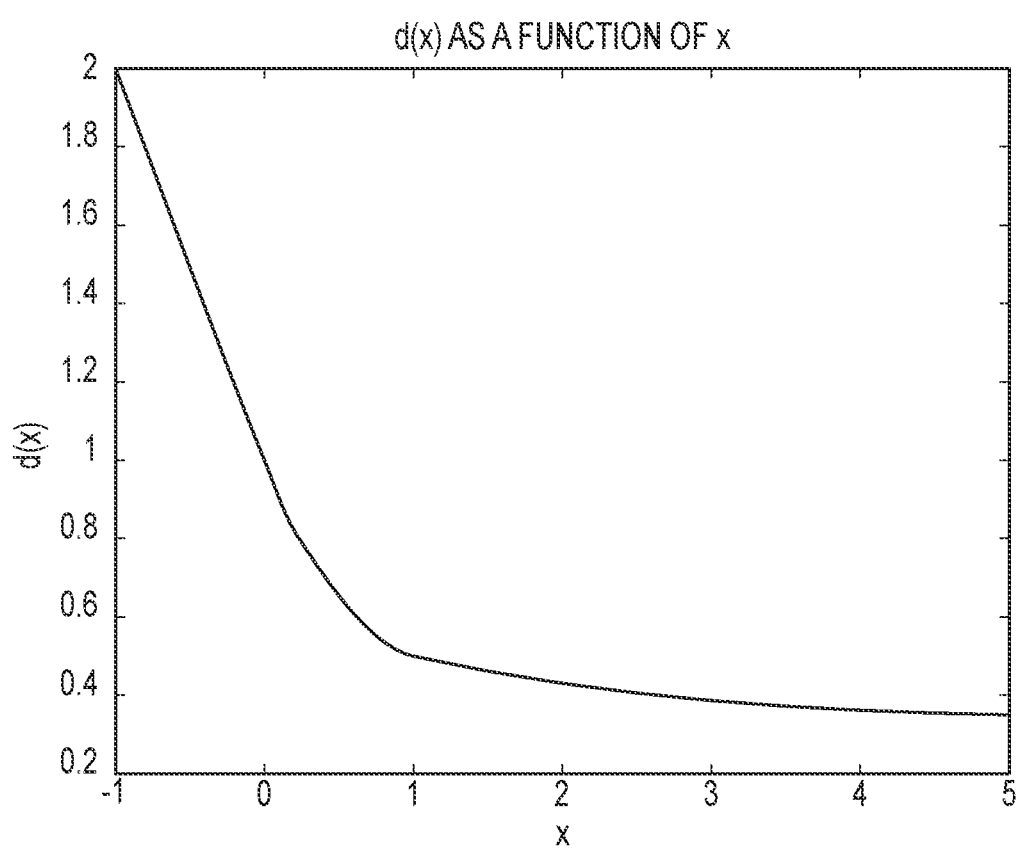
FIG. 1 is a curve illustrating a function that is formed as a piecewise polynomial.

The present invention comprises a method for frame rate resampling, the method comprising using an algorithm whereby the algorithm provides for smoothly ramping apparent speed and creating the output frames by using a plurality of input frames for each output frame. The method comprises smoothly ramping apparent speed comprising aligning created output frames with appropriate input frames.

The method of the present invention comprises determining input frames corresponding to each output frame comprising optimizing the piecewise polynomial and producing an output frame using a minimizing solver to optimally achieve an integer non-fractional mapping.

The present invention further comprises a method for frame rate resampling, the method further comprising an integer mapping from output to input frames.

The present invention further comprises a method for frame rate resampling comprising solving for a repeating pattern of fractional input frame locations wherein the average absolute fractional offset from an integer number frame is kept constant. The method further comprises creating the output frames by weighting the input frames by coefficients of a finite impulse response (FIR) filter and resolving strong negative values resulting from the FIR filter by means of a damped subtraction. The method comprises producing the damped subtraction using a function with a slope (derivative) of −1 between 0 and 0.2, and monotonically decreasing above 0.2 but never negative.

DETAILED DESCRIPTION OF THE INVENTION

The present invention addresses and improves on deficiencies in devices and methods currently used. The transformation function from input frames to output frames is specified initially by the user by indicating keyframes with desired transformation speeds at those locations. Current limitations poorly handle the inherent non-integer values that such specifications will lead to, since the user is specifying the first derivative of the actual transformation (rate rather than actual position). This invention comprises a method that makes small adjustments to the user's specified positions to achieve optimal integer mapping from input frames to output frames in the integrated function. Also, while finite impulse response filters have been employed to resample digital cinema frames, the problem of negative values in well-formed FIR coefficients has not been previously addressed with respect to very bright highlights in the footage. This invention addresses that issue and comprises a method to correct this problem.

The present invention provides for an algorithm for frame rate resampling comprising a method for determining the mapping of input frames to output frames; a method for smoothly ramping the mapping of input frames to output frames based on interactive user input; a method for optimizing the alignment of input frames to output frames such that during areas of constant speed the alignment is optimally centered on the frames; a method for computing the weighting function for averaging input frames to output frames; and a method for handling negative values in the weighting function in regions of bright highlights.

Frame mapping comprises the mapping of input frames to output frames with variable speed and allowing user interactive input starts with specified user points, or keyframes. Each point in the timeline of the acquired clip from the digital camera is specified by the user, along with the desired playback speed at that point.

The algorithm computes a piecewise polynomial spline to form a function "f(if)", which is the function returning speed for a given input frame number "if." The first integral of f(if) is g(if). This function "g(if)" will return the output frame number corresponding to the input frame number "if."

The inverse of "g(if)" is "invg(of)". The function invg(of) will return the input frame number corresponding to the output frame number "of."

A desirable property of the functions g and invg is that for regions of constant speed and of integer resampling rates, the mapping is from integer to integer numbers. That is, if "if" is an integer, it is desired that g(if) also be an integer value with no fractional part. In the case of the entire clip being of constant speed, this is trivial. However, if an earlier region of the clip has undergone a speed ramp, it is important to adjust the piecewise polynomial.

The present invention comprises a method of adjustment and is described herein. For each region between user-specified keyframes, if the region is of constant speed (i.e. both endpoints have the same speed value), a minimizing solver is employed to apply an adjustment (between −0.5 frames and 0.5 frames) to the position of the "start" endpoint of the region until mapping in the region is optimally integer-to-integer.

Damped subtraction is used to produce an output frame from a plurality of input frames surrounding the point specified by the "invg" function, wherein the input frames are weighted (or multiplied) by an array of values and then summed to produce a single output frame. The values for weighting during this downsampling operation are called the "resampling kernel" or "synthetic shutter."

Good resampling kernels will often have negative values. Therefore some frames from the input footage are effectively subtracted from the output. A method for smoothly limiting the amount of subtraction of very bright regions in the image is desired, because the input frames have a very wide dynamic range that is later trimmed during editing. Such a method is to limit the subtraction based on the overall amount of subtraction allowed. This is accomplished by first accumulating the sum of all frames scaled by positive values of the resampling kernel and naming this image "m." Similarly, all negative values of the resampling kernel are made positive (complemented) and used to scale and sum the appropriate frames into a single image named "s." The final output image would normally be computed by the simple relationship: output=m−s. If the expression "output=m−s" is replaced by the expression "output=m*h (s/m)", it is equivalent as long as the function h(x) is defined as "h(x)=1−x."

For damped subtraction, however, the expression h(x) is replaced with a new function, d(x), which has several damping properties, i.e: d(x) is the same as h(x) in the region between x=−Inf and x=0.2; d(x) is continuous; d(x) is monotonically decreasing; d(x) is always positive; and d(x) at x=0.2 has a continuous derivative equal to −1.

Such a function can be formed as a piecewise polynomial having the following shape, as seen in FIG. 1.

Figure 2:
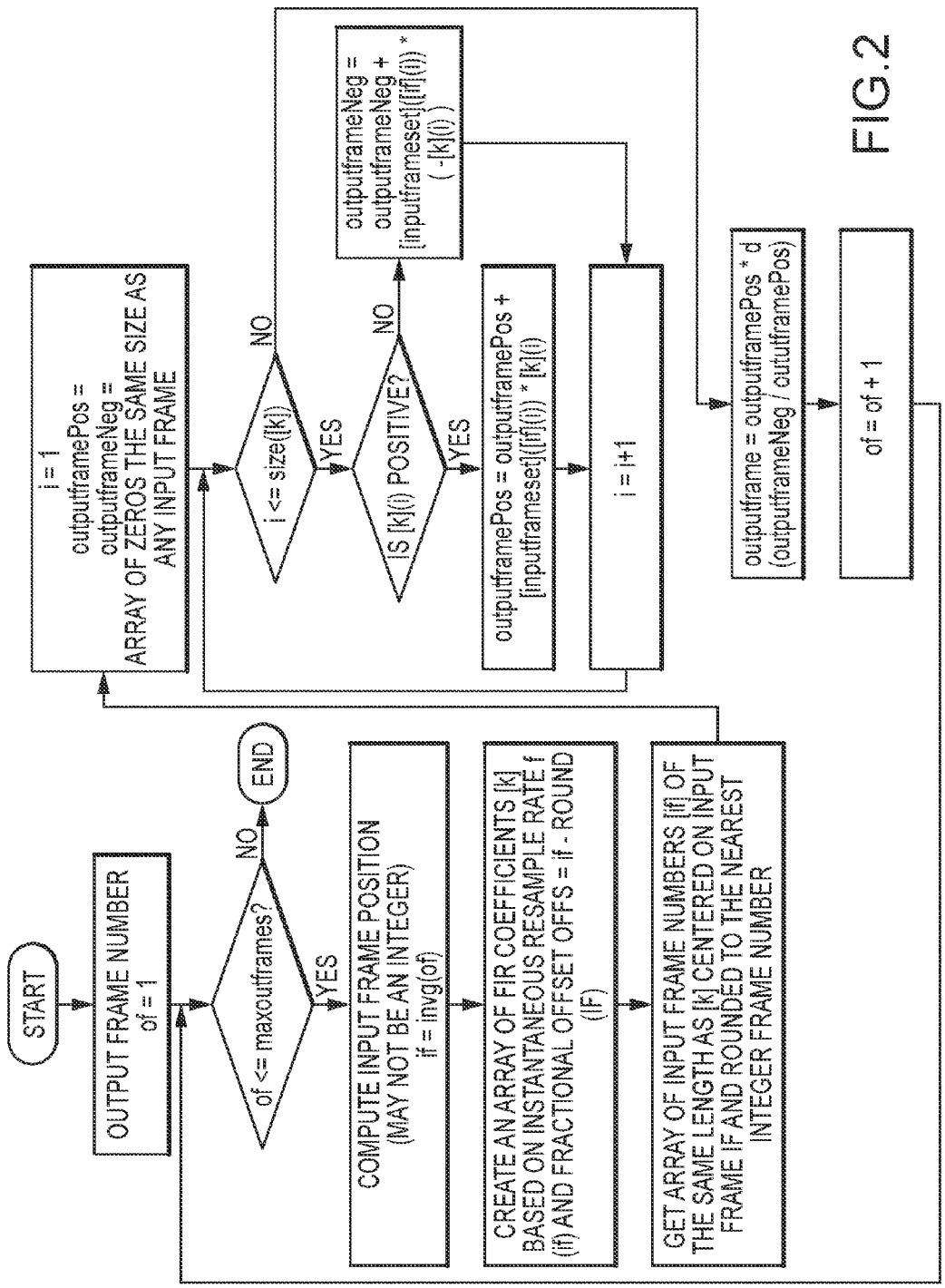
FIG. 2 is a flowchart depicting an implementation of the method of temporal resampling according to an embodiment of the present invention.
Figure 3:
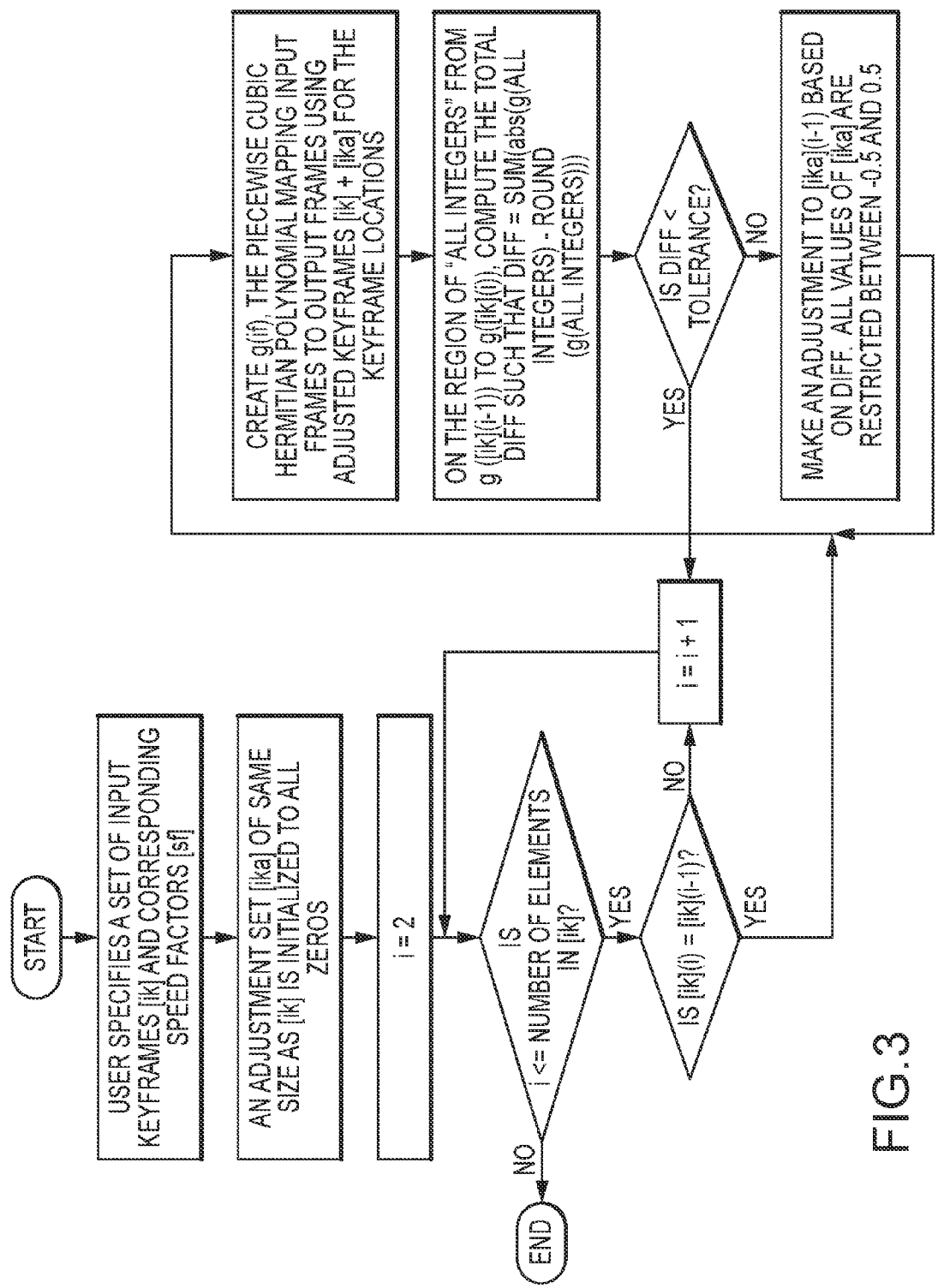
FIG. 3 is a flowchart depicting a method for refining the temporal remapping function to optimally map integer input frame numbers to integer output frame numbers while allowing user input.

FIG. 2 is a flowchart depicting an implementation of the method of temporal resampling according to an embodiment of the present invention; and FIG. 3 is a flowchart depicting a method for refining the temporal remapping function to optimally map integer input frame numbers to integer output frame numbers while allowing user input.

Although the invention has been described in detail with particular reference to these preferred embodiments, other embodiments can achieve the same results. Variations and modifications of the present invention are obvious to those skilled in the art and it is intended to cover all such modifications and equivalents.

What is claimed is:

1. A method of processing digital motion picture data captured by a digital motion picture camera, the method comprising:

receiving the digital motion picture data from the digital motion picture camera, the received digital motion picture data including received digital input frame data;

receiving keyframe input data that at least partially defines specified digital input frame data and at least partially defines a desired output sequence, wherein the specified digital input frame data is at least a portion of the received digital input frame data, wherein the specified digital input frame data is representative of a specified group of digital input frames, and wherein the specified group of digital input frames includes a specified starting digital input frame representative of a specified start position;

comparing the specified digital input frame data to the desired output sequence to detect whether the desired output sequence is a constant-speed output;

if the desired output sequence is detected to be constant-speed output, generating adjusted digital input frame data in order to adjust the specified start position to an adjusted start position and increase integer-to-integer mapping between the specified digital input frame data and the desired output sequence, wherein the adjusted digital input frame data is representative of an adjusted group of digital input frames, the adjusted group of digital input frames including an adjusted starting digital input frame that differs from the specified starting digital input frame; and generating digital output frame data using the adjusted digital input frame data, wherein the generating includes modifying the adjusted digital input frame data based at least in part on the desired output sequence.

2. The method of claim 1, wherein the keyframe input data that at least partially defines additional specified digital input frame data and at least partially defines a second desired output sequence,
wherein the additional specified digital input frame data is at least a portion of the received digital input frame data, wherein the additional specified digital input frame data is representative of a second specified group of digital input frames, and wherein the second specified group of digital input frames includes a second specified starting digital input frame representative of a second specified start position.

3. The method of claim 2, further comprising:
comparing the additional specified digital input frame data to the second desired output sequence to detect whether the second desired output sequence is a constant-speed output;
if the second desired output sequence is not detected to be constant-speed output, generating additional digital output frame data using the additional specified digital input frame data, wherein the generating includes modifying the additional specified digital input frame data based at least in part on the second desired output sequence.

4. The method of claim 3, wherein the generating of the additional digital output frame data comprises computing a piecewise polynomial function based at least in part on the second desired output sequence.

5. The method of claim 4, wherein the generating of the additional digital output frame data further comprises calculating weighted values based on weighted sums of portions of the additional specified digital input frame data representative of respective groups of the second specified group of digital input frames.

6. The method of claim 5, wherein the generating of the additional digital output frame data further comprises adjusting the weighted values based on the piecewise polynomial function.

7. A method of processing digital motion picture data, the method comprising:
receiving the digital motion picture data generated by a digital motion picture camera, the received digital motion picture data being representative of a motion picture;
receiving a plurality of user-specified keyframes that define a plurality of specified regions of respective time periods of the motion picture;
detecting a rate-change region from among the plurality of specified regions, the rate-change region comprising a plurality of digital input frames to be time-based modified as a digital output frame; and
computing the digital output frame based at least in part on a piecewise function that changes depending on a brightness level of the plurality of digital input frames.

8. The method of claim 7, wherein the piecewise function is a function of a sum of a plurality of weighted values.

9. The method of claim 8, wherein the plurality of weighted values is based at least in part on respective ones of the plurality of digital input frames.

10. The method of claim 7, further comprising detecting a steady-rate region from among the plurality of specified regions, the steady-rate region comprising a second plurality of digital input frames to be output as digital output frames without being time-based modified.

11. The method of claim 10, further comprising adjusting a start frame of the steady-rate region to allow for an integer-to-integer mapping of digital input frames to digital output frames of the steady-rate region.

* * * * *